United States Patent
Sander et al.

(10) Patent No.: US 8,637,158 B2
(45) Date of Patent: Jan. 28, 2014

(54) POLYMERIZABLE COMPOSITION FOR COATING METALS

(75) Inventors: Jörg Sander, Velbert (DE); Jürgen Stodt, Neuss (DE); Holger Endres, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 793 days.

(21) Appl. No.: 12/565,006

(22) Filed: Sep. 23, 2009

(65) Prior Publication Data

US 2010/0081001 A1 Apr. 1, 2010

Related U.S. Application Data

(63) Continuation of application No. PCT/EP2007/063646, filed on Dec. 11, 2007.

(30) Foreign Application Priority Data

Mar. 27, 2007 (DE) .......................... 10 2007 015 161

(51) Int. Cl.
*B32B 15/09* (2006.01)
*B05D 3/06* (2006.01)
*C23F 11/00* (2006.01)
*C09K 3/00* (2006.01)

(52) U.S. Cl.
USPC ........... 428/463; 428/457; 428/461; 427/551; 427/559; 252/387; 252/388; 252/389.1; 252/389.2; 252/389.3; 252/389.52; 252/389.53; 252/389.54

(58) Field of Classification Search
None
See application file for complete search history.

(56) References Cited

U.S. PATENT DOCUMENTS

| | | | | |
|---|---|---|---|---|
| 4,709,066 A | * | 11/1987 | Chapman | 556/437 |
| 4,798,773 A | * | 1/1989 | Yasukawa et al. | 429/313 |
| 2008/0279809 A1 | * | 11/2008 | Hackbarth et al. | 424/78.32 |

FOREIGN PATENT DOCUMENTS

| | | |
|---|---|---|
| DE | 1957355 A1 | 8/1970 |
| DE | 3623845 A1 | 1/1987 |
| DE | 19751153 A1 | 5/1999 |
| DE | 19923118 A1 | 11/2000 |
| DE | 102005045441.0 A1 | 5/2007 |
| EP | 0269018 A2 | 6/1988 |
| EP | 0685534 A1 | 12/1995 |
| JP | 05249415 A * | 9/1993 |
| JP | 07268024 A | 10/1995 |
| SU | 5513343 A1 | 3/1977 |
| WO | 0069978 A1 | 11/2000 |
| WO | 2007033736 A1 | 3/2007 |

OTHER PUBLICATIONS

Official Communication from the German Patent Office dated Jan. 24, 2008, German Patent Application No. 102007015161.8.
International Search Report dated Mar. 28, 2008, PCT International Application PCT/EP2007/063646.
German Abstract of SU 5513343 A1, Hochmolekularbericht 1979, Ref. H 76/79, Suvorov, et al, Jun. 23, 1977.

* cited by examiner

*Primary Examiner* — Monique Jackson
(74) *Attorney, Agent, or Firm* — Mary K. Cameron

(57) ABSTRACT

The present invention relates to a polymerizable composition and to a method for coating metal surfaces, in particular steel, galvanized and alloy-galvanized steel, and also aluminum and alloys thereof, as protection against corrosion. The polymerizable composition preferably contains less than 10% by weight of portions which are not incorporated in the cured coating. In a further aspect, the invention relates to the use of the claimed composition for coating workpieces consisting of the above-mentioned metals, particularly metal surfaces in blanking lines (coil coating). The present invention therefore also comprises the use of metal surfaces, coated according to the invention, for the production of "white goods" (household appliances), automobile bodies, electronic component housings, and for the building trade and the transport sector.

18 Claims, No Drawings

POLYMERIZABLE COMPOSITION FOR COATING METALS

This application is a continuation under 35 U.S.C. Sections 365(c) and 120 of International Application No. PCT/EP2007/063646, filed Dec. 11, 2007 and published on Oct. 2, 2008 as WO 2008/116511, which claims priority from German Patent Application No. 102007015161.8 filed Mar. 27, 2007, which are incorporated herein by reference in their entirety.

FIELD OF THE INVENTION

The present invention relates to a polymerizable composition and to a method for the anticorrosion coating of metallic surfaces, in particular steel, galvanized and alloy-galvanized steel, and of aluminum and the alloys thereof. The polymerizable composition here preferably contains less than 10 wt. % of fractions which are not incorporated into the cured coating. In a further aspect, the invention relates to the use of the composition according to the invention for coating workpieces consisting of the stated metals, in particular of metallic surfaces in coil coating plants. The present invention therefore also comprises the use of metallic surfaces coated according to the invention for the production of "white goods", automotive bodies, electronic component housings and for the construction industry and transport sector.

BACKGROUND OF THE INVENTION

Galvanized or alloy-galvanized steel strips are provided with temporary anticorrosion protection either by simply oiling them with anticorrosion oils or, if exposure to more severe corrosive conditions is expected, by phosphating or chromating them. A multistage process generally takes place prior to final coating with organic binders (primers, paints). When galvanized metal strip or aluminum and the alloys thereof are used in the domestic appliance and architectural industry, optionally after prior removal of the oil layer, the metal surface is firstly provided with an anticorrosion layer. The best anticorrosion measure known in the prior art is chromating, in which the metal surface is coated with a layer containing chromium(III) and/or chromium(VI), generally in amounts of for instance 5 to 15 mg/m$^2$ of chromium. Phosphating as an alternative temporary anticorrosion measure has two disadvantages: on the one hand, the appearance of the metal surfaces may be undesirably changed. On the other hand, phosphating is highly complex in terms of plant engineering, since, depending on the substrate material, it requires an additional activation stage and generally a passivation stage after phosphating. Apart from an anticorrosion effect, the inorganic coating also provides good adhesion to the primer applied thereon. The primer in turn not only has a favorable influence on the anticorrosion action of the inorganic conversion layer, but the primer layer itself in turn also provides good base for the topcoat material.

Strip finishers increasingly supply sheet metal with a preapplied coating, which for example facilitates mechanical processing such as stamping, drilling, folding, profiling and/or deep drawing. This preapplied coating must impart to the sheet metal properties which not only inhibit corrosion but also facilitate mechanical processing. A further function of such preapplied coatings is to provide a base for subsequent decorative topcoat layers. A workpiece produced by mechanical processing from a sheet metal material precoated in this manner may then finally be provided with a topcoat. The preapplied coating according to the invention further-more preferably acts as a primer, the topcoat layer then being applied immediately thereafter in the coil coating plant. In this case, only once it is fully coated is the sheet metal material sent for further processing. According to the prior art, the coil coating method substantially consists of three sub-steps. In a first step, the metal strip is cleaned and provided with an (inorganic) pretreatment layer, in the second step the primer is applied, and in the final third method step the topcoat is applied. In some applications, clear coats or protective film coverings may additionally be applied. Attempts have been made to provide just with the pretreatment step those functions which facilitate use in the manner of the above-stated preapplied coating. For example, a suitable organic polymer is added to the inorganic conversion treatment for this purpose, which polymer is capable of forming a surface film exhibiting the functional properties required of a preapplied coating.

EP-A-685534 describes a method for protecting a steel substrate by a thin film of an organic/inorganic hybrid polymer based on an alkoxysilane, a further condensable organometallic compound of the formula M(OR)$_4$ and (meth)acrylic acid, water and a polymerization initiator. Coating is effected by thermal or photopolymerization. Zirconium and titanium are mentioned as metals for the organometallic compound. It is stated that such a film protects steel substrates from corrosion and oxidation and this coating is moreover intended to protect the substrate from impact and other mechanical effects.

DE 197 51 153 describes polymerizable chromium-free organic compositions containing titanium, manganese and/or zirconium salts of olefinically unsaturated polymerizable carboxylic acids and further olefinically unsaturated comonomers and an initiator for free-radical polymerization and the use thereof for organic coil coating of metallic materials. These non-aqueous polymerizable compositions allow chromium-free pretreatment of steel materials with anticorrosion properties.

WO 00/69978 describes a polymerizable chromium-free anticorrosion agent containing metal complexes of an α-unsaturated carboxylic acid of the general formula (1):

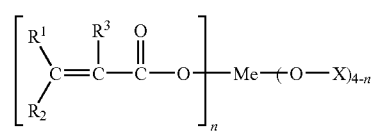

in which
R$^1$ and/or R$^2$ is/are H, C$_1$- to C$_{12}$ alkyl, aralkyl or the group —CO—O—Y,
R$^3$ is H or C$_1$ to C$_{12}$ alkyl,
Me is a titanium, silicon or zirconium ion,
X is H, C$_1$ to C$_{12}$ alkyl, aryl or aralkyl, alkoxyl, aroxyl, sulfonyl, phosphate, pyrophosphate,
Y is H, C$_1$ to C$_{12}$ alkyl or Me, and n is 0 to 4,
at least one further olefinically unsaturated comonomer with at least two olefinically unsaturated double bonds per molecule,
optionally further comonomers with one olefinically unsaturated double bond per molecule,
at least one initiator for free-radical and/or cationic polymerization.

In relation to an anticorrosion coating with an antimicrobial action, DE 102005045441.0, which is as yet unpublished, describes polymerizable chromium-free organic compositions containing metal complexes of derivatized α-unsaturated carboxylic acids of the general formula (2):

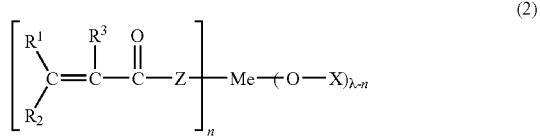

in which
R$^1$ and/or R$^2$ may be H, C$_1$- to C$_{12}$ alkyl, aralkyl or the group —CO—O—Y,
R$^3$ may be H or C$_1$ to C$_{12}$ alkyl,
Me may be a metal atom with an oxidation state of λ selected from silicon, titanium, zirconium, manganese, zinc, vanadium, molybdenum and tungsten,
X may be H, C$_1$ to C$_{12}$ alkyl, aryl, aralkyl, alkoxyl or aroxyl or 2(—O—X)=acetylacetonate,
Y may be H, C$_1$ to C$_{12}$ alkyl or a further metal ion Me,
Z is selected from O, NH, a group O—Z$^b$—C(=O)—O, a group —O—Z$^b$—P(=O)—O, a group O—Z$^b$—P(=O)$_2$—O, a group O—Z$^b$—O—P(=O)—O, a group O—Z$^b$—O—P(=O)$_2$—O, a group O—Z$^b$—S(=O)$_2$—O, a group O—Z$^b$—O—S(=O)$_2$—O, in which Z$^b$ represents an organic grouping, and
n is 0 to λ, preferably 1 to (λ-1), in which A means the oxidation state of the metal Me.

A preferred derivatization for the purposes of the above-stated invention for ensuring adequate anticorrosion protection by the cured coating is the condensation of hydroxyethyl methacrylate with succinic anhydride and the corresponding titanium alkoxides to yield metal complexes which are of the general formula (2).

Despite the wide-ranging prior art, a need still remains for improved anticorrosion agents and coating methods for metal surfaces which permit chromium-free pretreatment of the metallic substrates with good corrosion protection while avoiding strong acids and elevated fluoride concentrations. The constituents should here preferably be homogeneously dissolved or dispersed in the composition in order to avoid segregation during production, transport, storage and use.

Application of the coating by the coil coating method, in which the metal strips to be coated are unwound from and rewound onto the coil on conveyor belts at strip speeds of up to 200 m/min, as is conventionally preferred in the prior art, means that the applied coating agent must be completely cured within the shortest possible time.

The coating itself must meet the requirement that stamping and forming of the components from the coated metal strips can proceed without loss of the anticorrosion properties, i.e. without detachment or destruction of the coating in the formed area. The layers on the metal substrates should furthermore withstand the subsequent manufacturing steps until assembly of the products, such as for example cleaning, optionally phosphating, riveting, welding and be overcoatable with a topcoat, either directly or after mechanical processing. For reasons of environmental protection and industrial safety, it should be possible to perform the treatment method without using chromium compounds and, where possible, also with exclusion of organic solvents.

SUMMARY OF THE INVENTION

In summary, the object of the present invention is to provide a coating agent for metal surfaces which
1. is suitable for application by the coil coating method,
2. is curable thermally or by the action of high-energy radiation such as for example UV radiation,
3. in the cured state at a layer weight of no more than 25 g/m$^2$ effects sufficient anticorrosion protection, the coating with the agent constituting the sole anticorrosion measure, and
4. as a coating cured on the metallic material, exhibits excellent forming properties in the T-bend test.

It has surprisingly been found that, by developing the as yet unpublished application DE 102005045441.0 by a further derivatization of the polymerizable metal complexes of the general formula (I) used therein, the above object can be achieved in its entirety.

It is therefore an object of the invention to provide a polymerizable composition for anticorrosion coating of metallic surfaces containing components:
a) at least one compound according to the following general formula (I):

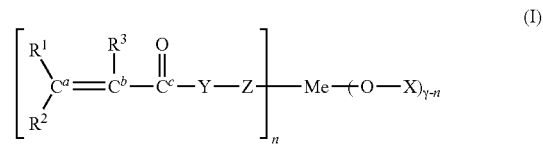

in which:
Me represents a metal atom with an oxidation state γ, said metal atom being selected from the group consisting of silicon, titanium, zirconium, manganese, zinc, vanadium, molybdenum and tungsten;
R$^1$ and R$^2$ are in each case mutually independently selected from hydrogen, C$_1$-C$_{12}$ alkyl, arylalkyl groups or from the group —CO—O—W and W is in each case mutually independently a hydrogen atom, a C$_1$-C$_{12}$ alkyl group or Me;
R$^3$ corresponds to a hydrogen atom or a C$_1$-C$_{12}$ alkyl group;
X represents a hydrogen atom, a C$_1$-C$_{12}$ alkyl, an aryl or an aralkyl group, an alkoxyl or aroxyl group or corresponds to 2(—O—X) acetylacetonate;
n is 1 to γ-1 and γ denotes the oxidation state of the metal Me;
Y represents an alkoxyl or polyalkoxyl group according to the following general formula (II):

in which the group Y is attached via the oxo function to C$^c$;
residues R$^4$ in each case mutually independently represent a hydrogen atom or a linear alkyl group with no more than 6 C atoms; and
p is at least 1 but no greater than 10 and, in the event that p is equal to 1, at least one residue R$^4$ does not represent a hydrogen atom; and
Z represents a group selected from: O, NH, S, O—C(=O)—Z$^b$—O, O—C(=O)—Z$^b$—NH, O—C(=O)—Z$^b$—S, O—C(=O)—Z$^b$—C(=O)—O, O—C(=O)—Z$^b$—P(=O)—O, O—C(=O)—Z$^b$—P(=O)$_2$—O, O—C(=O)—Z$^b$—O—P(=O)—O or O—C(=O)—Z$^b$—O—P(=O)$_2$—O, in which $Z^b$ represents an organic group and carboxyl group —O—C(=O)— is attached to the group Y; and
b) in addition to component a) at least one comonomer or cooligomer, different from a) which comprises:
at least one carboxyl or an ester group; and
at least one olefinic double bond.

DETAILED DESCRIPTION OF THE INVENTION

The present invention therefore comprises a polymerizable composition for the anticorrosion coating of metallic surfaces or materials, which at least contains:
a) a compound of the general formula (I):

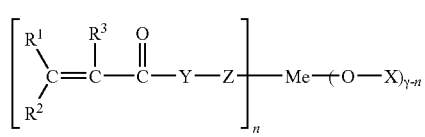

(I)

wherein $R^1$ and $R^2$ are in each case mutually independently selected from hydrogen, $C_1$-$C_{12}$ alkyl, arylalkyl groups or from the group —CO—O—W where W is in each case mutually independently a hydrogen atom, a $C_1$-$C_{12}$ alkyl group or Me;
$R^3$ corresponds to a hydrogen atom or a $C_1$-$C_{12}$ alkyl group;
Me represents a metal atom with the oxidation state γ, which is selected from the group consisting of silicon, titanium, zirconium, manganese, zinc, vanadium, molybdenum and tungsten;
X represents a hydrogen atom, a $C_1$-$C_{12}$ alkyl, an aryl or an aralkyl group, an alkoxyl or aroxyl group or corresponds to 2(—O—X) acetylacetonate;
n is 1 to γ-1 and γ denotes the oxidation state of the metal Me;
Y represents an alkoxyl or polyalkoxyl group according to the following general formula (II):

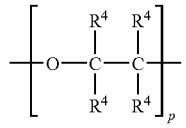

(II)

in which the group Y is attached via the oxo function to that part of the compound (I) which bears the olefinic double bond;
in which the residues $R^4$ in each case mutually independently represent a hydrogen atom or a linear alkyl group with no more than 6 C atoms; and
in which p is at least 1 but no greater than 10 and, in the event that p is equal to 1, at least one residue $R^4$ does not represent a hydrogen atom; and the group Z is: O, NH, S, O—C(=O)—$Z^b$—O, O—C(=O)—$Z^b$—NH, O—C(=O)—$Z^b$—S, O—C(=O)—$Z^b$—C(=O)—O, O—C(=O)—$Z^b$—P(=O)—O, O—C(=O)—$Z^b$—P(=O)$_2$—O, O—C(=O)—$Z^b$—O—P(=O)—O or O—C(=O)—$Z^b$—O—P(=O)$_2$—O,
in which $Z^b$ represents an organic group and the carboxyl group —O—C(=O)— is attached to the group Y; and
b) in addition to component a) at least one comonomer or cooligomer which comprises at least one carboxyl or an ester group and at least one olefinic double bond.

In a preferred embodiment of the polymerizable composition, group $Z^b$ of component a) is selected from:
a linear or branched alkyl group, preferably a linear alkyl group —(CH$_2$)$_x$—, in which x is an integer from 1 to 10, and in particular an integer from 2 to 4.
a linear or branched alkylene group with olefinic double bonds, preferably with a number of C atoms in the main chain which is no greater than 4, in particular vinylene.
a group of the type —(CH$_2$)$_x$—C$_6$H$_4$—(CH$_2$)$_y$—, in which x and y are in each case mutually independently integers from 0 to 4, preferably from 0 to 2, and particularly preferably x and y are equal to zero.

In accordance with the general formula (I), it is preferred according to the invention to use a component a) in which at least one, preferably two and in particular all of the residues $R^1$, $R^2$ and $R^3$ are in each case mutually independently selected from H, CH$_3$, C$_2$H$_5$, C$_3$H$_7$ and C$_4$H$_9$.

Moreover, in a preferred embodiment of the polymerizable composition, group Y of component a) is based on oxirane, 2-methyl-oxirane, 2,3-dimethyloxirane and 2-ethyl-oxirane, in which the number p of the constituent units of Y is no greater than 6, preferably no greater than 4, but is at least equal to 1 and preferably at least 3.

Particularly preferred embodiments of component a) are stated in the Examples section.

According to the present invention, an individual compound or, preferably, a mixture of different compounds, each of which corresponds to the above-stated definition of component b), may be present as component b). The group b) monomer or oligomer is here preferably selected from acrylic acid, methacrylic acid, crotonic acid, vinylacetic acid, maleic acid, fumaric acid and from monomers or oligomers which comprise at least one such acid group, in which the carboxylic acid groups may be completely or partially esterified.

The group b) monomer or oligomer may furthermore in particular be selected from aromatic or aliphatic urethane acrylate or urethane methacrylate oligomers and adducts or copolymers of acrylic acid or methacrylic acid or hydroxyalkyl derivatives thereof with unsaturated dicarboxylic acids or with anhydrides of polybasic carboxylic acids or derivatives thereof.

Examples of the stated unsaturated dicarboxylic acids are maleic acid and fumaric acid. One specific anhydride of polybasic carboxylic acids is succinic anhydride.

Preferably, at least part of component b) is an olefinically unsaturated comonomer with at least 2 olefinically unsaturated double bonds per molecule. Numerous comonomers are suitable as comonomers with at least 2 olefinically unsaturated double bonds per molecule, for example esterification products of alkane polyols, polyester polyols or polyether polyols with olefinically unsaturated carboxylic acids such as for example acrylic acid, methacrylic acid, itaconic acid, crotonic acid, maleic acid, maleic acid semiester, fumaric acid, fumaric acid semiester or reactive macromonomers containing carboxyl groups or mixtures thereof. Further suitable comonomers with at least 2 reactive double bonds per molecule are (meth)acrylate-functional polysiloxanes, (meth)acrylate-functional aliphatic, cycloaliphatic and/or aromatic polyepoxides and polyurethane compounds with reactive (meth)acrylate groups. The above-stated comonomers with at least 2 olefinically unsaturated double bonds per molecule typically have a molecular weight in the range from 600 to 50000, preferably between 1000 and 10000.

Specific examples of alkane polyols are 1,4-butanediol, 1,6-hexanediol, 1,8-octanediol, and the higher homologs thereof, glycerol, trimethylolpropane, pentaerythritol and the alkoxylation products thereof.

Further suitable polyols are the liquid polyesters which may be produced by condensation of di- or tricarboxylic acids, such as for example adipic acid, sebacic acid, glutaric acid, azelaic acid, suberic acid, 3,3-dimethylglutaric acid, terephthalic acid, isophthalic acid, hexahydrophthalic acid or dimer fatty acid with low molecular weight diols or triols such as for example ethylene glycol, propylene glycol, diethylene glycol, triethylene glycol, dipropylene glycol, 1,4-butanediol, 1,6-hexanediol, 1,10-decanediol, dimer fatty alcohol, glycerol or trimethylolpropane.

A further group of the polyol building blocks to be used according to the invention comprises the polyesters based on α-caprolactone, also known as "polycaproplactones".

It is, however, also possible to use polyester polyols of oleochemical origin. Such polyester polyols may for example be produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue. Further suitable polyols are polycarbonate polyols and dimer diols and castor oil and the derivatives thereof. Hydroxy-functional polybutadienes, as are for example available under the trade name "Poly-bd", may be used as polyols for the compositions according to the invention.

One or more of the free-radically polymerizable polyurethane compounds (A), (B) and/or (C) of the general formula (III) are also suitable for the present invention:

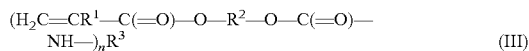

in which
R$^1$ is hydrogen or a methyl group,
R$^2$ is a linear or branched alkyl group with 2 to 6 C atoms or alkylene oxides with 4 to 21 C atoms; and
n is 1, 2 or 3, and
(A) where n=1, R$^3$ is
an aryl group with 6 to 18 carbon atoms,
a straight-chain or branched alkyl group with 1 to 18 C atoms or
a cycloalkyl group with 3 to 12 C atoms;
(B) where n=2, R$^3$ is:

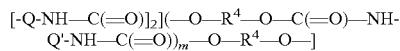

in which m=0 to 10 and R$^4$ is
a) a polycaprolactone diol residue
b) a polytetrahydrofurfuryl diol residue or
c) a diol residue which is derived from a polyester diol and has a molecular weight of 1000 to 20000, or
(C) where n=3, R$^3$ is:

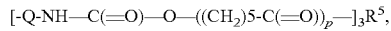

in which R$^5$ is a triol residue of a linear or branched trihydric alcohol containing 3 to 6 carbon atoms and p=1 to 10 and
Q and Q' are mutually independently aromatic, aliphatic or cycloaliphatic groups containing 6 to 18 carbon atoms, which groups are derived from diisocyanates or diisocyanate mixtures.

Examples of suitable aromatic polyisocyanates are: Any isomers of tolylene diisocyanate (TDI) either in isomerically pure form or as a mixture of two or more isomers, naphthalene 1,5-diisocyanate, diphenylmethane 4,4'-diisocyanate (MDI), diphenylmethane 2,4'-diisocyanate and mixtures of 4,4'-diphenylmethane diisocyanate with the 2,4' isomer or mixtures thereof with more highly functional oligomers ("crude MDI"), xylylene diisocyanate (XDI), 4,4'-diphenyldimethylmethane diisocyanate, di- and tetraalkyldiphenylmethane diisocyanate, 4,4'-dibenzyl diisocyanate, 1,3-phenylene diisocyanate, 1,4-phenylene diisocyanate.

Examples of suitable cycloaliphatic polyisocyanates are the hydrogenation products of the above-stated aromatic diisocyanates, such as for example 4,4'-dicyclohexylmethane diisocyanate (H12MDI), 1-isocyanatomethyl-3-isocyanato-1,5,5-trimethylcyclohexane (isophorone diisocyanate, IPDI), cyclohexane 1,4-diisocyanate, hydrogenated xylylene diisocyanate (H6XDI), 1-methyl-2,4-diisocyanatocyclohexane, m- or p-tetramethylxylene diisocyanate (m-TMXDI, p-TMXDI) and dimer fatty acid diisocyanate.

Examples of aliphatic polyisocyanates are tetramethoxybutane 1,4-diisocyanate, butane 1,4-diisocyanate, hexane 1,6-diisocyanate (HDI), 1,6-diisocyanato-2,2,4-trimethylhexane, 1,6-diisocyanato-2,4,4-trimethylhexane, butane 1,4-diisocyanate and 1,12-dodecane diisocyanate (C12DI).

Suitable epoxy resin building blocks for the olefinically unsaturated comonomers with at least two olefinically unsaturated double bonds per molecule comprise a plurality of polyepoxides which have at least two 1,2-epoxy groups per molecule. The epoxide equivalent of these polyepoxides may vary between 150 and 4000. The polyepoxides may in principle be saturated, unsaturated, cyclic or acyclic, aliphatic, alicyclic, aromatic or heterocyclic polyepoxide compounds. Examples of suitable polyepoxides include those polyglycidyl ethers which are produced by reacting epichlorohydrin or epibromohydrin with a polyphenol in the presence of alkali. Examples of polyphenols which are suitable for this purpose are resorcinol, pyrocatechol, hydroquinone, bisphenol A (bis-(4-hydroxyphenyl)-2,2-propane)), bisphenol F (bis(4-hydroxyphenyl)methane), bis(4-hydroxyphenyl)-1,1-isobutane, 4,4'-dihydroxybenzophenone, bis(4-hydroxyphenyl)-1,1-ethane, 1,5-hydroxynaphthalene. Further polyepoxides which are in principle suitable are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane. Further polyepoxides are polyglycidyl esters of polycarboxylic acids, for example products of the reaction of glycidol or epichlorohydrin with aliphatic or aromatic polycarboxylic acids such as oxalic acid, succinic acid, glutaric acid, terephthalic acid or dimer fatty acid. Further epoxides are derived from the epoxidation products of olefinically unsaturated cycloaliphatic compounds.

Specific examples of di-, tri- or polyfunctional (meth)acrylates to be used according to the invention are the following compounds: 1,3-butylene glycol di(meth)acrylate, 1,4-butanediol di(meth)acrylate, 1,6-hexanediol di(meth)acrylate, bisphenol A epoxide di(meth)acrylate, alkoxylated bisphenol A di(meth)acrylate, polyalkylene glycol di(meth)acrylate, trialkylene glycol diacrylate, tetraalkylene glycol di(meth) acrylate, neopentyl glycol di(meth)acrylate, alkoxylated neopentyl glycol di(meth)acrylate, trialkylolalkane tri(meth) acrylate, alkoxylated trialkylolalkane tri(meth)acrylate, glycerol alkoxy tri(meth)acrylate, pentaerythritol tri(meth) acrylate, tris-(2-hydroxyalkyl)isocyanurate tri(meth)acrylate, tri(meth)acrylate compounds containing acid groups, trimethylolpropane tri(meth)acrylate, trisalkoxy-trimethylolpropane tri(meth)acrylate, ditrimethylolpropane tetra (meth)acrylate, pentaerythritol tetra(meth)acrylate, alkoxylated pentaerythritol tetra(meth)acrylate, di pentaerythritol penta(meth)acrylate, dipentaerythritol hexa(meth)acrylate, in which "alkylene" means ethylene, propylene or butylene and "alkoxy" means ethoxy, 1,2- or 1,3-propoxy or 1,4-butoxy.

In addition, the following (meth)acrylate monomers may also be used: amine-modified polyether acrylate oligomers, carboxy-functionalized multifunctional (meth)acrylates, multifunctional melamine acrylates, difunctional silicone acrylates.

The following (meth)acrylates may also be used as monofunctional comonomers: mono-methacryloyloxyalkyl succinate, n-/iso-alkyl (meth)acrylate, cyclohexyl (meth)acrylate, 4-tert.-butylcyclohexyl (meth)acrylate, dihydrodicyclopentadienyl (meth)acrylate, tetrahydrofurfuryl (meth)acrylate, isobornyl (meth)acrylate (IBOA), α-carboxyethyl (meth) acrylate (α-CEA); mono(meth)acryloyl alkyl phthalates, succinate, maleate; 2-(2-ethoxyethoxy)ethyl (meth) acrylate, 2-phenoxyalkyl (meth)acrylate, alkanediol mono(meth)acrylate, allyl (meth)acrylate, hydroxyalkyl (meth)acrylate, 2,3-epoxyalkyl (meth)acrylate, N,N-dialkylaminoalkyl (meth) acrylate, N,N-dialkyl (meth)acrylamide, monoalkoxy trialkylene glycol (meth)acrylate, monoalkoxy neopentyl glycol alkyloxylate (meth)acrylate, polyalkylene glycol (meth)acrylate, alkoxylated nonylphenol (meth)acrylate, in which the alkyl groups may comprise 1 to 12 C atoms and "alkoxy" means ethoxy, 1,2- or 1,3-propoxy or 1,4-butoxy.

Particularly preferred examples of component b) are stated in the Examples section.

The polymerizable composition according to the invention here contains the following proportions by weight of components a) and b) relative to the total composition:
i) 1 to 80 wt. %, preferably 1 to 40 wt. % of component a)
ii) 20 to 95 wt. %, preferably 40 to 90 wt. % of component b).

The polymerization-curable composition according to the invention may be cured, for example, thermally or by the action of gamma or electron beam radiation. In this case, it is unnecessary for it additionally to contain a polymerization initiator. Should the coating agent according to the invention be such that it can be cured by polymerization by the action of electromagnetic radiation in the visible or UV range, it preferably contains at least one initiator for free-radical and/or cationic polymerization as component c). Depending on the initiators and monomers used, this curing process may proceed by a free-radical and/or cationic polymerization process.

In the event that initiators are essential for the curing process of the polymerizable composition, the proportion by weight of initiator in the total composition amounts with increasing preference to at least 0.02; 0.05; 0.1; 0.2; 0.5 wt. % and with increasing preference to no more than 10; 8; 5; 2 wt. %.

Suitable initiators for this free-radical and/or cationic polymerization (component c)) are for example the following initiators: 1-hydroxycyclohexyl phenyl ketone, (5,2,4-cyclopentadien-1-yl)-[(1,2,3,4,5,6-)-(1-methylethyl)-benzene] iron(1+) hexafluorophosphate(1−), 2-benzyldimethylamino-1-(4-morpholinophenyl)-butanone-1, benzil dimethyl ketal dimethoxyphenylacetophenone, bis(5-2,4-cyclopentadien-1-yl)-bis[2,6-difluoro-3-(1H-pyrrol-1-yl)phenyl]titanium, bis (2,4,6-trimethylbenzoyl)-phenylphosphine oxide (BAPO2), 2-methyl-1[4-(methylthio)-phenyl]-2-morpholinopropan-1-one, 1-(4-(1-methylethyl)-phenyl)-2-hydroxy-2-methyl-1-propan-1-one, 2-hydroxy-2-methyl-1-phenylpropan-1-one, 1,2-diphenylethane-1,2-dione, 1-[4-(2-hydroxyethoxy)-phenyl]-2-hydroxy-2-methyl-1-propan-1-one, (2,4,6-trimethylbenzoyl)diphenylphosphine oxide, hydroxybenzyl phenyl ketone, triarylsulfonium hexafluoroantimonate salts, triarylsulfonium hexafluorophosphate salts, oligo-(2-hydroxy-2-methyl-1-[4-(1-methylvinyl)phenyl]propanone), 1-propanone-2-hydroxy-2-methyl-1-[4-(1-methylethenyl)phenyl] homopolymer, phosphonic acid benzoyl bis(2,6-dimethylphenyl)ester, benzophenone, methyl orthobenzoylbenzoate, methyl benzoylformate, 2,2-diethoxyacetophenone, 2,2-di-sec-butoxyacetophenone, [4-(4-methylphenylthio)phenyl]-phenylmethanone-4-benzoyl-4'-methyldiphenyl sulfide, p-phenylbenzophenone, 2-isopropylthioxantone, 2-methylanthraquinone, 2-ethylanthraquinone, 2-chloroanthraquinone, 1,2-benzanthraquinone, 2-t-butylanthraquinone, 1,2-benzo-9,10-anthraquinone, benzil, benzoin, benzoin methyl ether, benzoin ethyl ether, benzoin isopropyl ether, alpha-methylbenzoin, alpha-phenylbenzoin, Michlers ketone, benzophenone, 4,4'-bis-(diethylamino)benzophenone, acetophenone, diethoxyphenylacetophenone, thioxanthone, diethylthioxanthone, 1,5-acetonaphthalene, ethyl p-dimethylaminobenzoate, benzil ketones, 2,4,6-trimethylbenzoyldiphenylphosphine oxide, benzil ketal (2,2-dimethoxy-1,2-diphenylethanone), 1-hydroxycyclohexyl phenyl ketone, 2-methyl-1[4-(methylthio)-phenyl]-2-morpholinopropan-1-one and/or 2-hydroxy-2-methyl-1-phenyl-1-propane and/or mixtures thereof. These may optionally be combined with further free-radical initiators of the peroxide or azo type and/or with amine accelerators.

If cationic polymerization is preferably to be used, vinyl ethers may also be used as comonomers.

Examples of such vinyl ethers are vinyl methyl ether, vinyl ethyl ether, vinyl propyl ether, vinyl isobutyl ether, vinyl dodecyl ether, vinyl octadecyl ether, vinyl cyclohexyl ether, vinyl 4-hydroxybutyl ether, 1,4-butanediol divinyl ether, 1,4-cyclohexanedimethanol divinyl ether, diethylene glycol divinyl ether, triethylene glycol divinyl ether, as well as the following vinyl compounds N-vinylpyrrolidone, vinylcaprolactam, 1-vinylimidazole, divinylethyleneurea.

Specific examples of component c) are the mixtures of polymerization initiators stated in the Examples section consisting of 2-hydroxy-2-methyl-1-phenylpropanone with 1-hydroxyethylcyclohexyl phenyl ketone and bis-(2,4,6-trimethylphenyl)-acylphenylphosphine oxide or a mixture of 2,3-dihydro-6-(2-hydroxy-2-methyl-1-oxopropyl)-1,1,3-trimethyl-3-[4-(2-hydroxy-2-methyl-1-oxopropyl)phenyl]-1H-indene and 2,3-dihydro-5-(2-hydroxy-2-methyl-1-oxopropyl)-1,1,3-trimethyl-3-[4-(2-hydroxy-2-methyl-1-oxopropyl)phenyl]-1H-indene commercially obtainable under the trade name ESACURE® KIP 100 (Lamberti Deutschland GmbH).

Particulate inorganic compounds d) which are added to the polymerizable composition according to the invention in a proportion by weight of 1 to 20 wt. % are suitable for improving the forming behavior and anticorrosion protection of the cured coating. These particulate inorganic compounds d) are selected from oxides of silicon, titanium, zirconium, manganese, zinc, vanadium, molybdenum and tungsten, in which the average particle size should be no greater than 5 μm, preferably no greater than 1 μm and in particular no greater than 0.1 μm.

In one specific embodiment, the polymerizable composition additionally contains group e) compounds which comprise both a polyether chain of at least 5 ethylene oxide and/or propylene oxide units and at least one carboxyl or ester group with at least one polymerizable double bond and which differ from component a). These impart anti-adhesive properties towards microorganisms to the polymerization-cured composition. The nature and quantity of component e) must here be selected such that, on the one hand sufficient anti-adhesive action towards microorganisms is achieved and that, on the other hand, the cured coating exhibits the necessary anticorrosion protection action. This is generally achieved if the group e) compound has a molar mass in the range from 250 to 2500, preferably in the range from 300 to 650. These comprise compounds with a polyethylene glycol and/or polypropylene glycol chain of at least 5 such units in which a carboxylic acid residue with at least one polymerizable double bond located at one or both ends of the chain. The carboxylic acid residue is generally joined to the polyether chain by an ester bond.

Specific examples of group e) compounds with anti-adhesive properties may be found in the as yet unpublished German application DE 102005045441.0, to the content of which explicit reference is made with regard to this group of compounds.

Group e) compounds, which differ from group a) compounds, are present in the application solution according to the invention in a proportion by weight of 0.01 to 20 wt. %.

A person skilled in the art is aware that the above-stated components a) to e), in particular the metal complex compounds a), may enter into reactions with one another and, being industrial products, may contain impurities, such that they are present in the treatment composition in the form which corresponds to the thermodynamic equilibrium under the stated conditions, provided said equilibrium has already been established. The tables in the Examples section should be understood in this light. These indicate which raw materials in which quantities were used to produce the composition according to the invention. It is to be expected that individual components will react with one another when the raw materials are mixed.

For example, esters may form from alcohols and carboxylic acids. If desired, such a reaction may be brought about by heating the mixture during production. This applies in particular for the metal complex compound a) used, which may, for example, bear γ-n alkoxide groups. The alkoxide will react at least in part with further components of the mixture, eliminating the alcohol. The eliminated alcohol may remain in the product, so reducing the viscosity thereof. The alcohol formed may, however, be stripped out by heating and/or applying a vacuum, if it is important for the least possible solvent to vaporize during curing of the coating.

It is furthermore known to a person skilled in the art that alkoxylation of alcohols or carboxylic acids, which constitutes a characteristic synthesis step for specific embodiments of the metal complex compound a), always yields product mixtures of molecules with a differing degree of alkoxylation.

The above-stated components a) to e) constitute the majority of the agent according to the invention, i.e. their proportions preferably add up to at least 50 wt. %, particularly preferably to at least 80 wt. % and in particular to at least 90 wt. %, the proportion by weight of additional components preferably being less than 50 wt. %, particularly preferably less than 20 wt. % and in particular less than 10 wt. %.

The agent according to the invention here preferably contains no more than 30 wt. %, particularly preferably no more than 10 wt. % and in particular no more than 5 wt. % of further constituents or components such as for example adhesion promoters, in particular silanes or alkoxysilanes, and the hydrolysis and condensation products thereof, or corrosion inhibitors, in particular organic phosphonates and phosphates, or organic biocides, such as aldehydic active ingredients, quaternary ammonium compounds and isothiazolone compounds, or inorganic fillers such as sulfates or silicates, in particular phyllosilicates, provided these do not fall within the definition of the previously stated particulate inorganic compounds, component d), or further auxiliary substances such as modified polyethylene wax.

Irrespective of whether the polymerizable composition according to the invention additionally contains such adhesion promoters, anticorrosion agents, biocides or fillers, it is furthermore preferred for the composition to contain no more than 10 wt. %, preferably no more than 5 wt. % of components which are not incorporated into the layer arising during curing by polymerization and which, as a pure component, have a boiling point of at most 250° C. at standard pressure. In their pure form, such components fall within the definition of volatile organic compounds (VOC) according to EU Directive 2004/42/EC. Components are considered to be incorporated into the resultant layer which are chemically, i.e. covalently or ionically, bonded in the layer matrix.

It is furthermore preferred for the composition to contain no more than 2 wt. % of such components which are volatile during curing. Such volatile components may be released either by the production process of component a) or by the production of the composition according to the invention by reacting component a) with component b) and so enter the composition. This is for example the case if component a) is prepared from the alkoxide or the acetylacetonate of one of the stated metals. If the composition's content of volatile components arising in this manner exceeds the desired upper limits, said content may be reduced to the preferred maximum quantity by suitable technical measures, such as for example heating and/or application of a vacuum.

In a second aspect, the present invention relates to a coating method for providing anticorrosion protection and enhanced coating adhesion on metallic surfaces or metal strip, wherein the following process steps are carried out as follows:
(i) bringing the composition according to the invention into contact with the metallic surface at a process temperature of at least 15° C., preferably of at least 30° C., but at a process temperature of no higher than 80° C., preferably of no higher than 60° C.;
(ii) optionally removing the excess quantity of the composition according to the invention from the metallic surface;
(iii) curing the film of the composition according to the invention located on the metallic surface by means of thermal methods or high-energy irradiation, preferably by electron beam radiation or UV irradiation, within at least $10^{-5}$ seconds and no more than 10 seconds.

In this method, the composition according to the invention is applied onto the metallic surface in a manner known per se by roller application (Chem-Coating), doctor blading, film drawing (curtain flow method), dipping/squeegeeing or spraying/squeegeeing. This preferably takes place in the metal strip coil coating method. If the treatment according to the invention takes place immediately after a metallic surface finishing operation, for example electrolytic galvanization or hot dip galvanization of steel strips, the strips may be brought into contact with the treatment solution or dispersion according to the invention without prior cleaning. However, if the metal strips to be treated have been stored and/or transported before being coated according to the invention, they are generally provided with anticorrosion oils or at least so extensively soiled that cleaning is required before the coating according to the invention. This may proceed with conventional weakly to strongly alkaline cleaning products; in the case of aluminum and the alloys thereof also with acidic cleaning products.

The compositions according to the invention are preferably cured or crosslinked by ultraviolet (UV) radiation or by electron beam radiation. Suitable UV radiation has wavelength of between 200 and 800 nm, preferably between 250 and 450 nm. Radiation intensity is here determined by the desired application speed, the initiator system and the comonomer composition and may readily be determined by a person skilled in the art.

Any conventional electron beam source may be used for the alternatively used electron beam radiation. Accelerators of the van de Graaff generator, linear accelerator, resonance transformer or dynatron type may be mentioned by way of example. The electron beam radiation here has an energy of approx. 50 to 1000 keV, preferably of between 100 and approx. 300 keV, the resultant radiation dose being between approx. 0.1 and 100 Mrad.

Curing of the composition applied to the metal surface may furthermore be initiated by input of thermal energy. Thermal curing may proceed by conventional heating methods by means of ovens, but inter alia also by laser-induced heating, microwave or IR irradiation.

The method according to the invention yields cured coatings with a layer weight of at least 0.5 g/m$^2$, preferably of at least 2 g/m$^2$, but of no more than 25 g/m$^2$ and preferably of no more than 8 g/m$^2$.

The coating method according to the invention preferably constitutes the only measure for anticorrosion treatment of the metal surface. It is thus unnecessary for the metal strip surface to be subjected to another anticorrosion protection treatment prior to application of the coating agent according to the invention. The coating agent according to the invention may thus be applied directly onto the freshly produced or cleaned metal strip surface. It is furthermore preferred for the coating of the metal strip surface with the composition according to the invention to constitute the sole coating applied. Further coating layers may, however, additionally be applied for the purposes of coating according to the invention.

The composition according to the invention or the coating method according to the invention may in particular be used to treat metallic surfaces which are selected from zinc, steel, galvanized or alloy-galvanized steel, stainless steel or of aluminum and the alloys thereof.

The invention also relates to a coated metal strip or metal sheet divided therefrom, which may optionally be formed, which comprises a coating which is obtainable by the above-described method.

The invention also relates to the use of a substrate which has been coated with the composition according to the invention in accordance with the above-stated method for the production of "white goods", automotive bodies, electronic component housings and for the construction industry and the transport sector.

EXAMPLES

A polymerizable composition according to the invention is prepared by mixing the individual component a), or the precursors required for the production of the individual component a), with component b) and optionally with further components, inter alia components c) to e). If the precursors of individual component a) are used to provide the composition according to the invention, the mixture is stirred at elevated temperature for some time, such that the components can react with one another. Such a mixture according to the invention may then be used as a coating agent either immediately or after the removal of volatile, low molecular weight compounds which arise during the reaction of the individual components and in particular during the reaction of the precursors of individual component a) with one another. Alternatively, the polymerizable metal complexes a) according to the invention are produced by simply heating a mixture of the necessary precursors with stirring and, after cooling and optionally after removing volatile, low molecular weight compounds under reduced pressure, adding thereto component b) and additionally further components, inter alia components c) to e).

Typical precursors for component a) may be subdivided into three groups, the first group comprising metal compounds of the metals silicon, titanium, zirconium, manganese, zinc, vanadium, molybdenum and/or tungsten with for example alkoxides, such as iso-propoxylate, or acetylacetonate. The metal compound Ti(isopropoxylate)$_4$ is conventionally used as the precursor for component a) according to the invention. The second precursor group encompasses mono- and poly-alkoxylated unsaturated carboxylic acids such as for example tri- and tetra-ethoxylated (EO3MA; EO4MA) or tri-propoxylated (PO3MA) methacrylic acid. Dicarboxylic acids and the anhydrides thereof, or hydroxycarboxylic acids and hydroxycarboxamides, and the internal esters thereof, which react by condensation reactions on the one hand with the metal complex and on the other hand with the alkoxylated unsaturated carboxylic acids and form adducts corresponding to the structural formula (I), are for example used as the third precursor for component a) according to the invention. Succinic anhydride (SA) is preferably used as a representative of this group of precursors. Formation of component a) may here be monitored by determining the acid value to DIN 53402. The component a) according to the invention synthesized in this Example according to structural formula (I) is obtained from a mixture of Ti(isopropoxylate)$_4$, succinic anhydride (SA) and tri-propoxylated methacrylic acid (PO3MA). This component a) is hereinafter denoted PO3MA-SA-Ti.

The formulation of Table 1 is a basic formulation for the Examples according to the invention (B1-B3, Table 2), with different components a) in each case being used in a proportion by weight of 35 wt. %, as represented by PO3MA-SA-Ti in the Table, below.

TABLE 1

| Compound/Product | Component | Proportion wt. % |
|---|---|---|
| PO3MA-SA-Ti | Component a) | 35.0 |
| Acrylic resin (50-75%) | Component b) | 35.6 |
| Acrylated monomer (25-50%) | | 2.5 |
| Tri-acrylated acid ester | | |
| 2-Hydroxy-2-methyl-1-phenyl-propan-1-one (30%) | Component c) | 4.3 |
| Oligo-[2-hydroxy-2-methyl-1-[4-(1-methylvinyl)-phenyl]-propanone] (70%) | | |
| ZnO (finely divided; <30 nm particle size) | Component d) | 13.3 |
| BaSO$_4$ | Pigment | 6.7 |
| PTFE-modified polyethylene wax | Auxiliary substance | 2.6 |

Table 2 lists the exemplary components a) according to the invention (B1-B3) and a polymerizable metal complex corresponding to the nomenclature of the general structural formula (I) used for Comparative Example (V1). The polymerizable metal complexes are here named in accordance with the nomenclature of the individual precursor groups as previously explained.

TABLE 2

| | | Structural formula (I)$^\#$ | | |
|---|---|---|---|---|
| Example | Name | X | Y | Z$^b$ |
| V1 | HEMA-SA-Ti | —CH—(CH$_3$)$_2$ | —O—(CH$_2$)$_2$— | —(CH$_2$)$_2$— |
| B1 | EO3MA-SA-Ti | —CH—(CH$_3$)$_2$ | —[O—(CH$_2$)$_2$]$_3$— | —(CH$_2$)$_2$— |

TABLE 2-continued

| | | Structural formula (I)[#] | | |
|---|---|---|---|---|
| Example | Name | X | Y | $Z^b$ |
| B2 | EO4MA-SA-Ti | —CH—(CH$_3$)$_2$ | —[O—(CH$_2$)$_2$]$_4$— | —(CH$_2$)$_2$— |
| B3 | PO3MA-SA-Ti | —CH—(CH$_3$)$_2$ | —[O—CH(CH$_3$)(CH$_2$)]$_3$— | —(CH$_2$)$_2$— |

[#]with $R^1$—$R^2$: H; $R^3$: —CH$_3$; Z: O—C(=O)—$Z^b$—C(=O)—O and n ≥ 1; = 4

The substrate used for the coatings comprised sheets of hot dip galvanized (HDG) steel. These were first of all cleaned with a commercial cleaning product (Ridoline® 1340, Henkel KGaA). In order to provide an application method which is as similar as possible to the industrial coil coating process, the polymerizable compositions were applied with a printing ink applicator (PASTE INK PROOFER, R K Print Coat Instruments Ltd., United Kingdom). In each case, 2-3 g of the compositions, which were obtained by mixing together the components according to Table 2, were applied onto a rubber roller and spread uniformly thereon by means of a laser-engraved steel roller. After a defined time, the excess material is removed from the application roller with a doctor blade. Immediately thereafter, the layer of polymerizable composition remaining on the application roller can be transferred onto a galvanized sheet (HDG) in a similar manner to the coil coating method. The layer thickness may here be adjusted by the hardness of the rubber coating of the application roller and the viscosity of the product.

The film of the compositions (V1, B1-B3) applied in this manner onto the galvanized sheet was in each case cured twice with UV radiation (Hg vapor lamp: $P_{hv}$=240 W/cm$^2$) at a simulated strip speed of 15 m/min, the effective duration of irradiation being approx. 4 ms. The film thickness of the cured composition according to Table 2 was 5 μm for all the layers containing titanium compounds V1 and B1-B3.

The metal sheets coated as previously described were tested in corrosion tests, bending tests and with regard to the chemical resistance of the film to solvents. Table 3 shows a summary of the test results of the respective coatings according to the invention (B1-B3) and the comparison coating (V1).

The comparison coating (V1) relates to a polymerizable composition containing the reaction product of titanium isopropoxylate with succinic anhydride (SA) and hydroxyethyl methacrylate (HEMA) in accordance with the as yet unpublished application DE 102005045441.0, which does not meet general formula (II) of the invention.

The experimental data show that examples B1 and B2 according to the invention provide poorer results with regard to corrosive creepage in the salt spray test than does the comparison coating. In particular, creepage values at the score are distinctly higher than for a coating according to V1. In contrast, in terms of the forming behavior and chemical resistance of the coating system, there are no significant differences and only the tetra-ethoxylated methacrylate (B2) does worse in the O-T bend test than the coatings according to V1 and B1. The tri-propoxylated methacrylates according to the invention (B3) exhibit performance in the various test procedures which at least equals that of all the other coatings. In particular, corrosive creepage at the score is distinctly reduced relative to the comparison (V1) for this cured coating containing compound PO3MA-SA-Ti. Chemical resistance is here only marginally below that of a degree of curing of 100.

Another aspect of this invention is manifested, due to the presence of the particulate ZnO in the polymerizable composition, in a comparison of the forming behavior of the cured compositions of V1 with V1* and B3 with B3*. The comparisons demonstrate that particulate ZnO in the cured layer distinctly improves forming behavior and consequently layer adhesion.

TABLE 3

| | | SST creepage[%] | | | Bending test[#] | Chemical resistance[†] |
|---|---|---|---|---|---|---|
| Example | Component a) | Hours/h | Score/mm | Edge/mm | Scale from 0-5 | DC |
| V1* | HEMA-SA-Ti | 360 | 2.2 | 3 | 3 | 100 |
| V1 | HEMA-SA-Ti | 240 | 1.1 | 2.4 | 2 | 100 |
| | | 360 | 2.0 | 3.7 | | |
| B1 | EO3MA-SA-Ti | 240 | 2.9 | 3.3 | 2 | 100 |
| | | 360 | 4.2 | 4.6 | | |
| B2 | EO4MA-SA-Ti | 240 | 2.6 | 3.4 | 3 | 100 |
| | | 360 | 4.2 | 4.8 | | |
| B3 | PO3MA-SA-Ti | 240 | 0.5 | 2.9 | 1 | 95 |
| | | 360 | 1.4 | 4.0 | | |

V1*: Composition according to Table 1 but without particulate pigment ZnO with a correspondingly larger fraction of the other components
SST: salt spray test
% creepage to DIN 53 167
[#]0-T bend test to ECCA standard T7
[†]MEK (methyl ethyl ketone) test to DIN EN 13 523-11
DC: degree of cure

What is claimed is:

1. A polymerizable composition for anticorrosion coating of metallic surfaces containing components:
   a) at least one compound according to the following general formula (I):

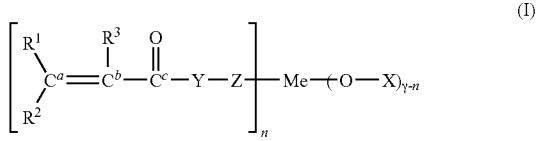

in which:
   Me represents a metal atom with an oxidation state $\gamma$, said metal atom being selected from the group consisting of silicon, titanium, zirconium, manganese, zinc, vanadium, molybdenum and tungsten;
   $R^1$ and $R^2$ are in each case mutually independently selected from hydrogen, $C_1$-$C_{12}$ alkyl, arylalkyl groups or from the group —CO—O—W and W is in each case mutually independently a hydrogen atom, a $C_1$-$C_{12}$ alkyl group or Me;
   $R^3$ corresponds to a hydrogen atom or a $C_1$-$C_{12}$ alkyl group;
   X represents a hydrogen atom, a $C_1$-$C_{12}$ alkyl, an aryl or an aralkyl group, an alkoxyl or aroxyl group or corresponds to 2(—O—X) acetylacetonate;
   n is 1 to $\gamma$−1 and $\gamma$ denotes the oxidation state of the metal Me;
   Y represents an alkoxyl or polyalkoxyl group according to the following general formula (II):

in which the group Y is attached via the oxo function to $C^c$;
   residues $R^4$ in each case mutually independently represent a hydrogen atom or a linear alkyl group with no more than 6 C atoms; and
   p is at least 1 but no greater than 10 and, in the event that p is equal to 1, at least one residue $R^4$ does not represent a hydrogen atom; and
   Z represents: O, NH, S, O—C(=O)—$Z^b$—O, O—C(=O)—$Z^b$—NH, O—C(=O)—$Z^b$—S, O—C(=O)—$Z^b$—C(=O)—O, O—C(=O)—$Z^b$—P(=O)—O, O—C(=O)—$Z^b$—P(=O)$_2$—O, O—C(=O)—$Z^b$—O—P(=O)—O or O—C(=O)—$Z^b$—O—P(=O)$_2$—O,
   in which $Z^b$ represents an organic group and carboxyl group —O—C(=O)— is attached to the group Y; and
   b) in addition to component a) at least one comonomer or cooligomer, different from a) which comprises:
   at least one carboxyl or an ester group; and
   at least one olefinic double bond.

2. The polymerizable composition according to claim 1, wherein the organic group $Z^b$ is:
   a linear or branched alkyl group;
   a linear or branched alkylene group with olefinic double bonds; or
   a —(CH$_2$)$_x$—C$_6$H$_4$—(CH$_2$)$_y$— group, in which x and y are in each case mutually independently integers from 0 to 4.

3. The polymerizable composition according to claim 1, wherein at least one of $R^1$, $R^2$ and $R^3$ is in each case mutually independently selected from H, $CH_3$, $C_2H_5$, $C_3H_7$ and $C_4H_9$.

4. The polymerizable composition according to claim 1, wherein group Y of component a) is based on oxirane, 2-methyl-oxirane, 2,3-dimethyloxirane or 2-ethyl-oxirane, and the number p is no greater than 6, but is at least equal to 1.

5. The polymerizable composition according to claim 1, wherein the comonomers or cooligomers used as component b) are selected from acrylic acid, methacrylic acid, crotonic acid, vinylacetic acid, maleic acid, fumaric acid and from monomers and oligomers which comprise at least one of said acids as an acid functional group; and optionally the acid functional groups are completely or partially esterified.

6. The polymerizable composition according to claim 1, wherein the monomers or oligomers used as component b) are:
   aromatic or aliphatic urethane acrylate oligomers;
   aromatic or aliphatic urethane methacrylate oligomers;
   adducts or copolymers of acrylic acid or methacrylic acid; or
   hydroxyalkyl derivatives of adducts or copolymers of acrylic acid or methacrylic acid with unsaturated dicarboxylic acids or with anhydrides of polybasic carboxylic acids or derivatives thereof.

7. The polymerizable composition according to claim 1, wherein components a) and b) are present in proportions by weight relative to total composition weight of:
   i) 1 to 80 wt. % of component a) and
   ii) 20 to 95 wt. % component b).

8. The polymerizable composition according to claim 7, further comprising as additional component c) an initiator or an initiator mixture for free-radical and/or cationic polymerization, in a proportion by weight of at least 0.1 wt. % and at most 10 wt. % relative to total composition weight.

9. The polymerizable composition according to claim 7, further comprising, relative to the total composition weight, 1 to 20 wt. % of component d) a particulate inorganic oxide selected from oxides of silicon, titanium, zirconium, manganese, zinc, vanadium, molybdenum and tungsten, said particulate inorganic oxide having an average particle size of no more than 5 μm.

10. The polymerizable composition according to claim 7, further comprising, relative to the total composition weight, 0.01 to 20 wt. % of an organic component e) comprising a polyether chain of at least 5 ethylene oxide and/or propylene oxide units and at least one carboxyl or ester group with at least one polymerizable double bond, said component e) being different from components a) and b).

11. The polymerizable composition according to claim 7, further comprising:
   component c) an initiator or an initiator mixture for free-radical and/or cationic polymerization;
   component d) a particulate inorganic oxide having an average particle size of no more than 5 μm
   component e) comprising a polyether chain of at least 5 ethylene oxide and/or propylene oxide units and at least one carboxyl or ester group with at least one polymerizable double bond, said component e) being different from components a) and b);
   wherein proportions by weight of components a) to e) add up to at least 50 wt. % of the total composition weight and additional components make up a proportion by weight of less than 50 wt %.

12. The polymerizable composition according to claim 11, wherein the proportion by weight of additional components amounts to no more than 30 wt. %, said additional components being:
adhesion promoters;
corrosion inhibitors;
organic biocides; and/or
inorganic fillers different from component d).

13. The polymerizable composition according to claim 1, wherein the composition contains no more than 10 wt. % of materials that have a boiling point of at most 250° C. at standard pressure and which, on curing of the composition by polymerization to form a layer, are not incorporated into said layer.

14. A coating method for providing anticorrosion protection and enhanced coating adhesion on a metallic surface, comprising steps of:
(i) bringing the polymerizable composition according to claim 1 into contact with a metallic surface at a process temperature of at least 15° C. but no higher than 80° C. thereby creating a film on the metal surface;
(ii) optionally removing excess quantities of the polymerizable composition from the metallic surface; and
(iii) curing the film located on the metallic surface by means of thermal methods or high-energy irradiation for a period of at least $10^{-5}$ seconds and no more than 10 seconds to form a cured coating.

15. The method according to claim 14, wherein the cured coating exhibits a layer weight of at least 0.5 $g/m^2$ but of no more than 25 $g/m^2$.

16. The method according to claim 14, wherein the metallic surface is steel, zinc, galvanized steel, alloy-galvanized steel, stainless steel, aluminum, aluminum alloy or combinations thereof.

17. A coated metal strip or a coated metal sheet divided from said metal strip, which may optionally be formed, comprising the film or cured coating according to claim 14.

18. An article of manufacture comprising the coated metal strip or coated metal sheet of claim 17.

* * * * *